US008094364B2

United States Patent
Park

(10) Patent No.: US 8,094,364 B2
(45) Date of Patent: Jan. 10, 2012

(54) OPTICAL FILM FOR DISPLAY APPARATUS USING ELECTROPHORESIS AND FILTER FOR DISPLAY APPARATUS HAVING THE SAME

(75) Inventor: Seong-Sik Park, ChungCheongNam-Do (KR)

(73) Assignee: Samsung Corning Precision Materials Co., Ltd. (KR)

( * ) Notice: Subject to any disclaimer, the term of this patent is extended or adjusted under 35 U.S.C. 154(b) by 0 days.

(21) Appl. No.: 12/277,565

(22) Filed: Nov. 25, 2008

(65) Prior Publication Data

US 2009/0135468 A1 May 28, 2009

(30) Foreign Application Priority Data

Nov. 26, 2007 (KR) .................. 10-2007-0121060

(51) Int. Cl.
G02B 26/00 (2006.01)
G09G 3/34 (2006.01)
(52) U.S. Cl. .................. 359/296; 345/107
(58) Field of Classification Search .............. 359/296; 345/107; 430/32; 204/600
See application file for complete search history.

(56) References Cited

U.S. PATENT DOCUMENTS

| 6,822,782 | B2* | 11/2004 | Pratt et al. ............. 359/296 |
| 7,116,466 | B2* | 10/2006 | Whitesides et al. ...... 359/296 |
| 2001/0030639 | A1* | 10/2001 | Goden ................ 345/107 |
| 2004/0051934 | A1 | 3/2004 | Machida et al. |
| 2008/0150888 | A1* | 6/2008 | Albert et al. ........... 345/107 |
| 2008/0198443 | A1* | 8/2008 | Yoshimura et al. ...... 359/296 |
| 2008/0277375 | A1* | 11/2008 | Paek et al. ............. 216/17 |

FOREIGN PATENT DOCUMENTS

| CN | 1479153 A | 3/2004 |
| JP | 2002-169191 A | 6/2002 |
| JP | 2004-139006 A | 5/2004 |
| JP | 2007-206500 A | 8/2007 |

OTHER PUBLICATIONS

Office Action from corresponding Chinese Application No. 200810180431.5 dated Mar. 2, 2010.

* cited by examiner

*Primary Examiner* — William Choi
(74) *Attorney, Agent, or Firm* — Lerner, David, Littenberg, Krumholz & Mentlik, LLP

(57) ABSTRACT

An optical film for a display apparatus using electrophoresis includes a transparent base having partition walls dividing the transparent base into cells, an electrophoresis dispersion which fills the cells and contains a dielectric medium and charged pigment particles dispersed throughout the dielectric medium, a front electrode provided in front of the cell, first and second in-plane electrodes provided behind the cell, and a rear electrode provided behind the cell in such a manner that the rear electrode is disposed between the first and second in-plane electrodes.

16 Claims, 2 Drawing Sheets

OPTICAL FILM FOR DISPLAY APPARATUS USING ELECTROPHORESIS AND FILTER FOR DISPLAY APPARATUS HAVING THE SAME

CROSS-REFERENCE TO RELATED APPLICATION

This application claims the benefit of Korean Patent Application No. 2007-0121060 filed on Nov. 26, 2007, in the Korean Intellectual Property Office, the disclosure of which is incorporated herein by reference.

BACKGROUND OF THE INVENTION

1. Field of the Invention

The present invention relates to an optical film for a display apparatus using electrophoresis and a filter for the display apparatus having the same.

2. Description of the Related Art

Recently, a cathode ray tube (CRT), which has been representative of existing display devices, is being replaced by a flat panel display (FPD), such as a liquid crystal display (LCD), a field emission display (FED), an organic light emitting display (OLED), a plasma display device, or the like. Among them, the plasma display device is in the spotlight because it has an excellent display performance in relation to luminance, a contrast ratio, image retention, a viewing angle, or the like. Hereinafter, the plasma display device will be described for illustrative purposes.

The plasma display device includes a plasma display panel. In the plasma display panel, gas discharge occurs, ultraviolet rays are generated and then a fluorescent material is activated by the ultraviolet rays, whereby visible light is generated. The plasma display device displays an image using the visible light.

However, the plasma display device has drawbacks in that a large amount of electromagnetic waves and near infrared rays are emitted due to its intrinsic characteristics. The electromagnetic waves and near infrared rays emitted from the plasma display device may have a harmful effect to the human body, and cause malfunction of precision appliances such as a remote controller.

Therefore, the plasma display device employs a filter in front of the display panel in order to block electromagnetic waves and near infrared rays. In addition, the filter for the display apparatus is required to have a good performance in relation to color purity, anti-reflection, a contrast ratio, etc. as well as blocking electromagnetic waves and near infrared rays. The filter for the display apparatus satisfying the above requirements is being manufactured.

In order to satisfy those requirements, the filter for the display apparatus is generally made by layering together several optical films such as an electromagnetic shielding film, a near-infrared ray blocking film, a color compensating film, an anti-reflection film, an external light blocking film, etc., which have respective functions, by a bonding agent or an adhesive. Among them, the external light blocking film blocks external light so as to improve a contrast ratio of a display apparatus.

However, since the external light blocking film absorbs external light even when the plasma display device is not driven, the screen of the plasma display device in an off state has a black color, which deteriorates the appearance thereof.

Furthermore, the latest plasma display device needs a further function of being capable of displaying pictures, information on weather or the like using only a small amount of electrical power when the plasma display panel is off, in addition to the basic display function when the plasma display panel is on.

SUMMARY OF THE INVENTION

The present invention has been made to solve the foregoing problems with the prior art, and therefore an object of the present invention is to provide a optical film for a display apparatus using electrophoresis which is capable of blocking external light when the display apparatus is on, and functioning as an information display device when the display apparatus, that is, the display panel is off.

An object of the present invention is not limited to the above-mentioned object, and other objects, which are not mentioned above, will be apparently understood from below by those skilled in the art.

In an aspect of the invention, there is provided an optical film for a display apparatus using electrophoresis including: a transparent base having partition walls dividing the transparent base into a plurality of cells; an electrophoresis dispersion which fills the cells and contains a dielectric medium and charged colored particles, for example, charged pigment particles dispersed throughout the dielectric medium; a front electrode provided in front of the cell; first and second in-plane electrodes provided behind the cell; and a rear electrode provided behind the cell in such a manner that the rear electrode is disposed between the first and second in-plane electrodes.

According to the above-described structure of the present invention, the optical film for a display apparatus can block external light and function as an information display device under the influence of the electric fields applied between the electrodes.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE EXEMPLARY EMBODIMENT

Figure 1:
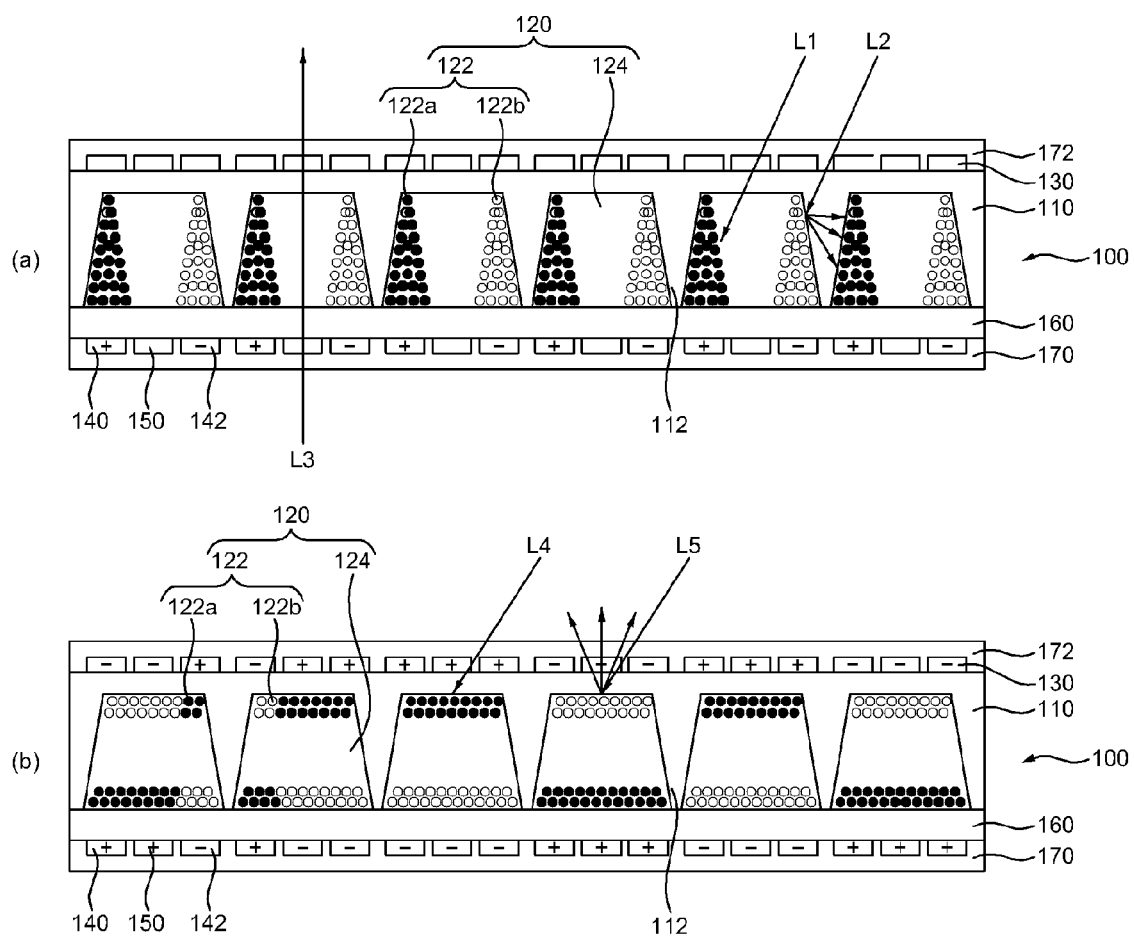
FIG. 1 is a cross-sectional view illustrating an optical film for a display apparatus using electrophoresis according to an embodiment of the present invention.

The present invention will now be described more fully hereinafter with reference to the accompanying drawings, in which exemplary embodiments thereof are shown. Wherever possible, the same reference numerals will be used throughout the drawings and the description to refer to the same or like parts.

A multi-functional optical film for a display apparatus using electrophoresis according to an embodiment of the invention may be independently employed in a liquid crystal display (LCD), a field emission display (FED), an organic light emitting display (OLED), a plasma display device, or the like, but the present invention is not limited thereto. Of course, the optical film may be provided for the display apparatus in such a manner that the optical film adheres to other optical films such as an electromagnetic shielding film a near infrared ray blocking film, a color compensating film, an anti-reflection film, or the like.

FIG. 1 is a cross-sectional view illustrating an optical film for a display apparatus using electrophoresis according to an embodiment of the present invention, wherein FIG. 1(a) shows the optical film can have a function of blocking external light, and FIG. 1(b) shows the optical film can function as an information display device.

Referring to FIG. 1, the optical film 100 for a display apparatus includes a transparent base 110, an electrophoresis dispersion 120, a front electrode 130, first and second in-plane electrodes 140 and 142, and a rear electrode 150. The optical film 100 may further include an encapsulating film 160 and first and second planarizing films 170 and 172.

The transparent base 110 may include transparent photocurable resin. Here, the photocurable resin may include e.g. polyfunctional acrylate, methacylate, vinyl ether, epoxide, and oligomer or polymer thereof.

Figure 2:
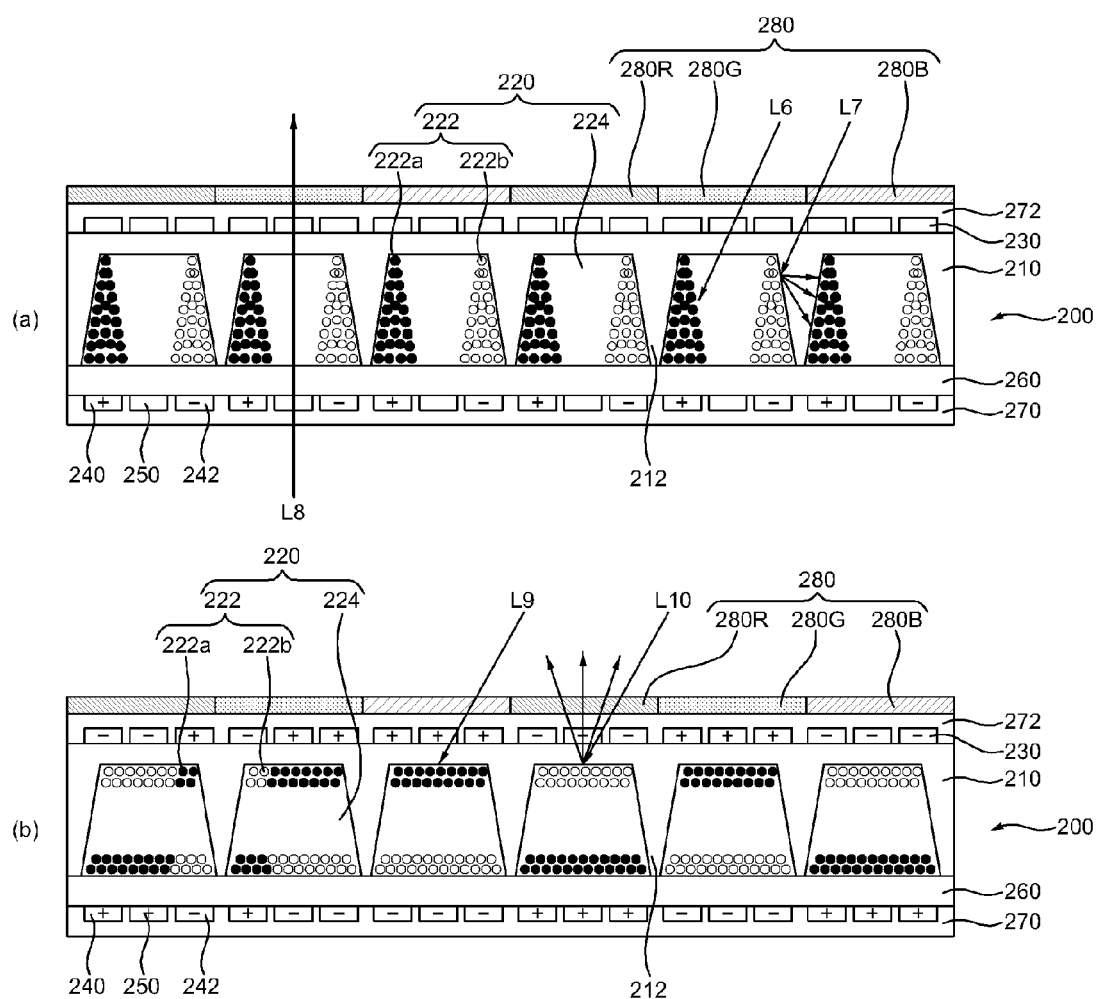
FIG. 2 is a cross-sectional view illustrating an optical film for a display apparatus using electrophoresis according to another embodiment of the present invention.

The transparent base 110 may include partition walls 112 which divide the base into cells. The partition wall 112 may have a trapezoidal cross section as illustrated in FIGS. 1 and 2. The partition wall 112 may have a mesh pattern when viewed from the front direction. Thus, the cells are shaped like a cup, and are arranged in a matrix pattern. The partition wall 112 may have a cross section with a trapezoidal shape, a rectangular shape, a square shape, or the like on a plane orthogonal to that in FIGS. 1 and 2. However, the present invention is not limited thereto. Furthermore, the shapes of the partition walls and the cells may be different from each other according to their positions.

The partition walls 112 may be prepared by the processes of applying the photocurable resin of transparent base 110 onto a transparent substrate, pressing the photocurable resin using a micro-embossing roller, and then curing the same.

The electrophoresis dispersion 120 fills the cells divided by the partition walls 112, and may contain a dielectric medium 124 and colored particles, for example, pigment particles 122. Instead of the pigment particles, other colored particles such as dye particles may be used.

The pigment particles 122 may have their own electric charges, or alternatively may be positively or negatively charged by charge control agents. This enables the pigment particles 12 to move in the electrophoresis dispersion under the influence of a certain electric field.

The pigment particles 122 have at least one color. For example, the pigment particles may include black pigment particles 122a and white pigment particles 122b. The black pigment particles 122a may include one or more species of e.g. aniline black, carbon black, and titanium black. The white pigment particles 122b may include one or more species of e.g. titanium dioxide, antimony trioxide, barium sulfate, zinc sulfide, and silicon dioxide. Although the pigment particles 122 may include at least one of pigment particles in yellow, red, green, or blue, a reference will now be made, for convenience of explanation, to the case where the pigment particles 122 consist of negatively charged black pigment particles 122a and positively charged white pigment particles 122b.

The dielectric medium 124 can serve to disperse the charged pigment particles 122. The dielectric medium 124 may have a low viscosity so that the pigment particles 122 can be moved more easily. The dielectric medium may include at least one species selected from a group consisting of: hydrocarbon such as decahydro naphthalene, 5-ethylidene-2-norbornene, fatty oils, paraffin oil, or the like; aromatic hydrocarbon such as toluene, xylene, phenylsilylethane, dodecylbenzene, alkyl naphthanene, or the like; and halogen medium such as perfluorodecalin, perfluorotoluene, perfluoroxylene, dichlorobenzotrifluoride, 3,4,5-trichlobenzotrifluoride, chloropentafluoro-benzene, dichlorononene, pentachlorobenzene, or the like.

One or more front electrode 130 may be provided in front of each cell, but the invention is not limited thereto. For example, the front electrode 130 may be integrally provided in front of all the cells.

A certain voltage from the outside may be applied to the front electrode 130, or the front electrode 130 may be grounded. The front electrode 130 may contain a transparent conductive material. The transparent conductive material may be indium tin oxide (ITO), indium zinc oxide (IZO), or the like.

First and second in-plane electrodes 140 and 142 may be provided behind each cell in such a manner that each is located near the partition wall 112. That is, the first and second in-plane electrodes 140 and 142 are located at a position corresponding to edges of a cell, respectively.

However, an arrangement of the in-plane electrodes is not limited thereto. For example, the first and second in-plane electrodes may be located in front of a cell. In this case, a bottom of a wedge shape may face a front direction, i.e. a viewer. Further, it is possible that the first in-plane electrode is provided for one cell, and the second in-plane electrode is provided for another cell adjacent to the one cell.

While both of the first and second in-plane electrodes 140 and 142 are typically provided for each cell, the present invention is not limited thereto.

Certain voltages from the outside may be applied to the first and second in-plane electrodes 140 and 142 so as to create a transverse electric field between them. Further, certain voltages may be applied to the first and second in-plane electrodes 140 and 142 so as to create a vertical electric field together with the front electrode 130. The first and second in-plane electrodes 140 and 142 may contain a transparent conductive material or an opaque metallic material. The first and second in-plane electrodes 140 and 142 may be preferably made of the same material as the rear electrode 150 considering a manufacturing process.

The rear electrode 150, at least one for each cell, may be provided behind a cell such that it is located between the first and second in-plane electrodes 140 and 142. Here, in the case that the optical film 100 serves as an information display device, as the number of the rear electrodes provided for each cell increases, the capability to display a gradation can be improved.

The rear electrode 150 to which a certain voltage from the outside is applied creates a vertical electric field together with the front electrode 130. The rear electrode 150 may contain a transparent conductive material. The transparent conductive material may be indium tin oxide (ITO), indium zinc oxide (IZO), or the like.

The encapsulating film 160 can encapsulate and protect the dielectric medium 124 throughout which the pigment particles 122 are dispersed. The encapsulating film 160 may contain photocurable resin. The photocurable resin may include e.g. polyvalent acrylate, methacrylate, cyanoacrylate, vinyl benzene, polyvalent vinyl, polyvalent epoxide, polyvalent isocyanate, polyvalent allyl, or the like.

The first planarizing film 170 is provided so as to cover the first and second in-plane electrodes 140 and 142 and the rear electrode 150. The first planarizing film can planarize the rear face of the optical film 100.

The second planarizing film 172 is provided so as to cover the front electrode 130. The second planarizing film can planarize the front face of the optical film 100.

The transparent base 110, the dielectric medium 124, the front electrode 130, the first and second in-plane electrodes 140 and 142, the rear electrode 150, the encapsulating film 160, and the planarizing film 170 may have the same or similar refractive index. This can enable light reflection between them to be reduced. However, the present invention is not limited thereto.

The optical film 100 having the above structure, as shown in FIG. 1(a), can block external light L1 and L2 when a display panel is on.

Hereinafter, reference will be made to, as a example, the case that a positive voltage is applied to the first in-plane electrode 140, a negative voltage is applied to the second in-plane electrode 142, and no voltage is applied to the front and rear electrodes 130 and 150.

In this case, a transverse electric field may be created between the first and second in-plane electrodes 140 and 142. Thus, the negatively charged black pigment particles 122a move towards the first in-plane electrode 140, and the positively charged white pigment particles 122b move towards the second in-plane electrode 142. That is, the black pigment particles 122a and the white pigment particles 122b may move towards the partition walls 112. Here, since the transverse field intensity becomes lower as it goes far from the first and second in-plane electrodes 140 and 142, the black pigment particles 122a and the white pigment particles 122b may be collected together to form a wedge shape. Even after the transverse electric field is removed, the wedge shapes of the collected pigment particles 122a and 122b can be maintained owing to a memory effect.

At this time, external light L1 incident to the black pigment particles 122a can be absorbed into the black pigment particles 122a. External light L2 incident to the white pigment particles 122b may be blocked, scattered or reflected by the white pigment particles 122b, and then be absorbed into the adjacent black pigment particles 122a. Further, light L3 which is incident to the optical film 100 from the rear direction may be emitted forwards via a region where the rear electrode 150 is located. Here, the light L3 refers to rays which, in the case where the optical film 100 is provided for a display apparatus, are emitted from a display panel in an on state.

Meanwhile, the optical film 100, as shown in FIG. 1(b), can serve as an information display device when a display panel is off.

Hereinafter, reference will be made to the case that voltage is applied to the front electrode 130, the first and second in-plane electrodes 140 and 142, and the rear electrode 150 at the same time.

In this case, a vertical electric field is created between the front electrode 130 and the first and second in-plane electrodes 140 and 142, as well as between the front electrode 130 and the rear electrode 150. Thus, the black pigment particles 122a and the white pigment particles 122b move towards the front and/or the rear of a cell. Even after the vertical field is removed, the pigment particles 122a and 122b maintain their positions owing to a memory effect.

At this time, external light L4 incident to a cell in which only the black pigment particles 122a are moved to the front of the cell is immediately absorbed into the black pigment particles 122a, so the cell shows a black color. External light L5 incident to a cell in which only the white pigment particles 122b are moved to the front of the cell is scattered and reflected by the white pigment particles 122b, so the cell shows a white color. The optical film can display a gradation if voltage applied to the front electrode 130, the first and second in-plane electrodes 140 and 142, and the rear electrode 150 is properly controlled so that the black pigment particles 122a and the white pigment particles 122b are arranged together in the front of a cell.

As set forth above, the optical film 100 using electrophoresis can, when the display panel is on, perform a function of blocking external light, and can, when the display panel is off, serve as an information display device. This can be advantageously realized even with low power consumption by virtue of a memory effect of the pigment particles 122.

FIG. 2 is a cross-sectional view illustrating an optical film for a display apparatus using electrophoresis according to another embodiment of the present invention, wherein FIG. 2(a) shows the optical film can perform a function of blocking external light, and FIG. 2(b) shows the optical film can serve as an information display device. The optical film of FIG. 2 is identical to that of FIG. 1, except that it further includes a color filter. Accordingly, a description will be made with respect to only a characteristic feature thereof.

Referring to FIG. 2, the optical film 200 for a display apparatus includes a transparent base 210, an electrophoresis dispersion 220, a front electrode 230, first and second in-plane electrodes 240 and 242, and a rear electrode 250. The optical film 200 may further include an encapsulating film 260 and first and second planarizing films 270 and 272. In addition, the optical film 200 may further include a color filter 280. Here, the transparent base 210 may include partition walls 212 which divide the base into cells. The electrophoresis dispersion 220 may contain pigment particles 222, for example, negatively charged black pigment particles 222a and positively charged white pigment particles 222b, and a dielectric medium 224.

The color filter 280 may be provided in front of the front electrode 230. The color filter 280 may include, e.g. a red color filter, a green color filter, and a blue color filter 280R, 280G, and 280B, one of which is provided for each cell. The color filter 280 enables various colors to be displayed through the additive mixing of red, green, or blue light passing through the color filter.

The optical film 200 having the above structure, as shown in FIG. 2(a), can, when a display panel is on, block external light L6 and L7. This is the same as in FIG. 1(a). However, in the case of FIG. 2(a), when light L8 incident to the optical film 200 from the rear direction is emitted forwards via a region where the rear electrode 250 is positioned, it travels through the color filter 280, so the optical film 200 can display colors.

Meanwhile, the optical film 200, as shown in FIG. 2(b), can, when a display panel is off, serve as an information display device. This is the same as in FIG. 1(b). However, in the case of FIG. 2(b), since external light L10 incident to a cell in which only the white pigment particles 222b are moved to the front of the cell is scattered and reflected by the white pigment particles 222b, and then travels through the color filter 280, the color of the corresponding part of the color filter 280 can be displayed. The optical film can display a gradation if voltage applied to the front electrode 230, the first and second in-plane electrodes 240 and 242, and the rear electrode 250 is properly controlled so that the black pigment particles 222a and the white pigment particles 222b are arranged together in the front of a cell. Further, the gradation ability can be improved by increasing the number of the rear electrodes 250 provided for each cell.

As set forth above, the optical film 200 using electrophoresis can, when the display panel is on, perform a function of blocking external light, and can, when the display panel is off, serve as an information display device. This can be advantageously realized even with low power consumption by virtue of a memory effect of the pigment particles 222.

A filter for a display apparatus can be fabricated by layering together the optical film of the present invention and other functional films which have been known in the art. Here, the functional film may include at least one of an anti-reflection film, a transparent substrate, an electromagnetic shielding film, a near infrared ray blocking film, a color compensating film, an anti-glare film, an anti-fog film, a hard coating film, and so on.

Since the above functional films and the display apparatus equipped with the above functional films have already been known, a detailed description thereof will be omitted. For more detailed technical structure thereof, documents referring to various filters for a display apparatus such as a plasma display filter, an LCD filter, or the like can be consulted.

Although preferred embodiments of the present invention have been described with reference to accompanying drawings, those skilled in the art will appreciate that various modifications, additions and substitutions are possible, without departing from the scope and spirit of the invention as disclosed in the accompanying claims. Thus, it should be understood that the preferred embodiments have been provided for illustrative, but not restrictive, purposes since they have been provided for informing those skilled in the art of the scope of the invention. The present invention will be defined only by the scope of claims.

What is claimed is:

1. An optical film for a display apparatus using electrophoresis, the optical film being arranged in front of a display panel of the display apparatus, the optical film comprising:
    a transparent base having partition walls dividing the transparent base into a plurality of cells;
    an electrophoresis dispersion with which the cells are filled; and
    an electrode for applying electrophoresis voltage to the electrophoresis dispersion;
    wherein the electrode includes a first in-plane electrode, a second in-plane electrode and further includes a front electrode and a rear electrode, the front electrode, at least one for each cell, being provided in front of each cell, and the rear electrode, at least one for each cell, being provided behind each cell, and
    wherein voltages with different polarities are applied to the first and second in-plane electrodes respectively, when the display panel is turned on.

2. The optical film for a display apparatus according to claim 1, wherein the first and second in-plane electrodes are provided for each cell.

3. The optical film for a display apparatus according to claim 1, wherein the first and second in-plane electrodes are provided behind the cell.

4. The optical film for a display apparatus according to claim 3,
    wherein the first in-plane electrode, at least one for each cell, is provided,
    the second in-plane electrode, at least one for each cell, is provided, and
    being located between the first and second in-plane electrodes.

5. The optical film for a display apparatus according to claim 1, further comprising a color filter, the color filter being arranged at the front of the optical film.

6. The optical film for a display apparatus according to claim 5, wherein the color filter has any one color of red, green, and blue for each cell.

7. The optical film for a display apparatus according to claim 1, wherein the partition wall of the transparent base has a trapezoidal cross section.

8. The optical film for a display apparatus according to claim 1, wherein the plurality of cells are arranged in a matrix pattern.

9. The optical film for a display apparatus according to claim 1, wherein the electrophoresis dispersion contains charged colored particles which are dispersed in the electrophoresis dispersion.

10. The optical film for a display apparatus according to claim 9, wherein the electrophoresis dispersion contains a dielectric medium, and the charged colored particles are dispersed throughout the dielectric medium.

11. The optical film for a display apparatus according to claim 9, wherein the charged colored particles include first and second colored particles which are charged to have different polarities, and have different colors.

12. The optical film for a display apparatus according to claim 11, wherein the first colored particles are black particles, and the second colored particles are white particles.

13. A filter for a display apparatus, the filter comprising:
    an optical film for a display apparatus using electrophoresis comprising a transparent base having partition walls dividing the transparent base into a plurality of cells, an electrophoresis dispersion with which the cells are filled, and an electrode for applying electrophoresis voltage to the electrophoresis dispersion, wherein the electrode includes a first in-plane electrode, a second in-plane electrode and further includes a front electrode and a rear electrode, the front electrode, at least one for each cell, being provided in front of each cell, and the rear electrode, at least one for each cell, being provided behind each cell, wherein voltages with different polarities are applied to the first and second in-plane electrodes respectively, when the display panel is turned on; and
    at least one of an anti-reflection film, a transparent substrate, an electromagnetic shielding film, a near infrared ray blocking film, a color compensating film, an anti-glare film, an anti-fog film, and a hard coating film,
    wherein the optical film and the at least one film are layered together.

14. An optical film for a display apparatus using electrophoresis, the optical film being arranged in front of a display panel of the display apparatus, the optical film comprising:
    a transparent base having partition walls dividing the transparent base into a plurality of cells;
    an electrophoresis dispersion with which the cells are filled; and
    an electrode for applying electrophoresis voltage to the electrophoresis dispersion,
    wherein the electrode further comprises front electrodes and rear electrodes, the front electrodes, at least two for each cell, being provided in front of each cell, and the rear electrodes, at least two for each cell, being provided behind each cell.

15. The optical film for a display apparatus according to claim 14, further comprising a color filter, the color filter being arranged at the front of the optical film.

16. The optical film for a display apparatus according to claim 15, wherein the color filter has any one color of red, green, and blue for each cell.

* * * * *